(12) United States Patent
Johnson et al.

(10) Patent No.: US 8,261,870 B2
(45) Date of Patent: Sep. 11, 2012

(54) METHOD FOR REMOVING OR INSTALLING ENDLESS POWER TRANSMITTING ELEMENT ON A MOTORCYCLE ASSEMBLY

(75) Inventors: David C. Johnson, Lapeer, MI (US); James W. Platt, New Haven, IN (US); Chane E. Myers, Maumee, OH (US); Harold W. Seeds, Irapuato (MX); Andrew P. Maguire, West Bloomfield, MI (US); Manoj V. Bhandiwad, White Lake, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 13/443,279

(22) Filed: Apr. 10, 2012

(65) Prior Publication Data

US 2012/0192396 A1   Aug. 2, 2012

Related U.S. Application Data

(63) Continuation of application No. 13/277,368, filed on Oct. 20, 2011, now Pat. No. 8,177,014, which is a continuation of application No. 13/111,624, filed on May 19, 2011, now Pat. No. 8,042,639, which is a continuation of application No. 12/726,744, filed on Mar. 18, 2010, now Pat. No. 7,984,782, which is a continuation of application No. PCT/US2008/073461, filed on Aug. 18, 2008.

(60) Provisional application No. 60/975,684, filed on Sep. 27, 2007.

(51) Int. Cl.
*B62M 9/02* (2006.01)

(52) U.S. Cl. ........ 180/217; 180/344; 180/346; 180/375; 180/378

(58) Field of Classification Search .................. 180/217, 180/239, 241, 251, 9.64, 350, 357, 373, 346, 180/344, 351, 358, 360, 375, 378, 379, 385, 180/380; 384/537, 546, 547; D12/126, 127

See application file for complete search history.

(56) References Cited

U.S. PATENT DOCUMENTS

| 294,753 A | 3/1884 | Bown |
| 741,931 A | 10/1903 | Sandell |
| 756,992 A | 4/1904 | Twitchell |
| 805,740 A | 11/1905 | Lowe |
| 906,017 A | 12/1908 | Hedgeland |
| 1,876,155 A | 9/1932 | Stern et al. |
| 1,950,034 A | 3/1934 | Mulford et al. |
| 1,991,618 A | 2/1935 | Lyman |
| 2,720,797 A | 10/1955 | Leo et al. |
| 2,995,378 A | 8/1961 | Whetstone |

(Continued)

FOREIGN PATENT DOCUMENTS

JP    9290652 A    11/1997

(Continued)

*Primary Examiner* — Joseph Rocca
*Assistant Examiner* — Keith Frisby
(74) *Attorney, Agent, or Firm* — Harness, Dickey & Pierce, P.L.C.

(57) ABSTRACT

A method for replacing an endless power transmitting element in a motorcycle having a rear axle assembly with a pair of driven wheels. The method includes: removing the bearing caps from the carrier structure; disengaging the shafts from the differential assembly; moving the differential assembly away from carrier structure; mounting the endless power transmitting element about the differential assembly and through an opening in the carrier housing; replacing the bearing caps to the carrier structure; and re-engaging the shafts to the differential assembly.

18 Claims, 15 Drawing Sheets

U.S. PATENT DOCUMENTS

| | | |
|---|---|---|
| 3,001,842 A | 9/1961 | Boyd |
| 3,041,890 A | 7/1962 | O'Brien |
| 3,171,293 A | 3/1965 | Robinson |
| 3,311,186 A | 3/1967 | Kamlukin |
| 3,359,803 A | 12/1967 | Long |
| 3,470,768 A | 10/1969 | Percifield et al. |
| 3,648,795 A | 3/1972 | Moulton |
| 3,673,889 A | 7/1972 | Hauser |
| 3,768,336 A | 10/1973 | Wharton |
| 3,817,354 A | 6/1974 | Meiners |
| 3,915,267 A | 10/1975 | Shea |
| 4,287,960 A | 9/1981 | McConnell |
| 4,325,449 A | 4/1982 | D'Addio et al. |
| 4,388,842 A | 6/1983 | Marcell |
| 4,449,602 A | 5/1984 | Dittmann, Jr. |
| 4,541,501 A | 9/1985 | Kawasaki |
| 4,561,518 A | 12/1985 | Grinde |
| 4,592,441 A | 6/1986 | Marier et al. |
| 4,876,918 A | 10/1989 | Hudson |
| 5,058,456 A | 10/1991 | Manrique et al. |
| D327,280 S | 6/1992 | Macomber |
| D346,781 S | 5/1994 | Homme |
| D352,275 S | 11/1994 | Crawley |
| 5,597,258 A | 1/1997 | Kincaid et al. |
| 5,692,577 A | 12/1997 | Dornbusch et al. |
| 5,806,371 A | 9/1998 | Hibbler et al. |
| 5,884,717 A | 3/1999 | Lehman et al. |
| 5,913,745 A | 6/1999 | Inagaki et al. |
| D424,988 S | 5/2000 | Rothlisberger |
| 6,086,162 A | 7/2000 | Pinch et al. |
| 6,189,410 B1 | 2/2001 | Inoue |
| 6,227,716 B1 | 5/2001 | Irwin |
| 6,305,487 B1 | 10/2001 | Montague |
| 6,334,568 B1 | 1/2002 | Seeds |
| 6,354,979 B1 | 3/2002 | Lohr |
| 6,386,564 B1 | 5/2002 | Kincad et al. |
| 6,398,689 B1 | 6/2002 | Morse et al. |
| 6,457,381 B1 | 10/2002 | Nonaka et al. |
| 6,604,270 B2 | 8/2003 | Kincaid et al. |
| 6,692,398 B1 | 2/2004 | Sullivan |
| 6,695,739 B2 | 2/2004 | Fett |
| 6,729,207 B2 | 5/2004 | Allmandinger et al. |
| 6,964,314 B1 | 11/2005 | Vey |
| 7,108,428 B2 | 9/2006 | Ason |
| 7,143,734 B1 | 12/2006 | Leppanen et al. |
| 7,228,930 B1 | 6/2007 | Vey |
| 7,377,598 B2 | 5/2008 | Doud et al. |
| 7,448,636 B2 | 11/2008 | Johnson et al. |
| 7,559,404 B2 | 7/2009 | Seeds et al. |
| D600,167 S | 9/2009 | Maguire et al. |
| 7,585,032 B2 | 9/2009 | Seeds et al. |
| 7,610,979 B1 | 11/2009 | Dykowski et al. |
| 2001/0052435 A1 | 12/2001 | Montague |
| 2002/0063011 A1 | 5/2002 | Montague |
| 2005/0067208 A1 | 3/2005 | Cheng |
| 2005/0184579 A1 | 8/2005 | Bryant et al. |
| 2005/0245342 A1 | 11/2005 | Pontanari et al. |
| 2007/0296196 A1 | 12/2007 | Poglavec |
| 2008/0020888 A1 | 1/2008 | Kearney |

FOREIGN PATENT DOCUMENTS

| | | |
|---|---|---|
| JP | 2002087011 A | 3/2002 |

METHOD FOR REMOVING OR INSTALLING ENDLESS POWER TRANSMITTING ELEMENT ON A MOTORCYCLE ASSEMBLY

CROSS-REFERENCE TO RELATED APPLICATIONS

This application is a continuation of U.S. Ser. No. 13/277,368 filed Oct. 20, 2011, which is a continuation of U.S. Ser. No. 13/111,624 filed May 19, 2011 (now U.S. Pat. No. 8,042,639), which is a continuation of U.S. Ser. No. 12/726,744 filed Mar. 18, 2010 (now U.S. Pat. No. 7,984,782), which is a bypass continuation of PCT/US 2008/073461 filed Aug. 18, 2008, which claims the benefit of U.S. Provisional Application No. 60/975,684 filed Sep. 27, 2007. Each of the aforementioned applications is incorporated by reference as if fully set forth in detail herein.

INTRODUCTION

The present invention generally relates to motorcycles and more particularly to an axle assembly for a motorcycle having a plurality of driven wheels, such as a three-wheeled motorcycle or trike.

Motorcycles having a plurality of driven wheels will commonly employ an endless power transmitting element, such as a belt or a chain, to transmit rotary power from a powertrain to a sprocket that is employed to drive a pair of rear wheels. When the sprocket is to be serviced or the endless power transmitting element is to be replaced, it is frequently necessary to disassemble the rear axle assembly of such motorcycles such that the axle housing assembly is separated in a lateral direction into two or more portions. While the configuration permits the axle assembly to be constructed in a relatively inexpensive manner given the relatively low volume requirements of such axle assemblies, we have noted several drawbacks of this configuration. In this regard, the rear axle of the motorcycle need be substantially broken down to replace an endless power transmitting element. Consequently, it was not practical to service a motorcycle with multiple drive wheels on the road if an endless power transmitting element, such as a belt, broke. Accordingly, there remains a need for an improved axle assembly for a motorcycle with a plurality of driven wheels.

SUMMARY

In one form, the present teachings provide a method for installing an endless power-transmitting element to a differential assembly of a motorcycle having an axle assembly with two drive wheels. The method can include: sliding first and second axle shaft assemblies outwardly from a differential assembly to disengage the first and second axle shaft assemblies from the differential assembly; removing a pair of bearing caps from a carrier housing; removing the differential assembly from the carrier housing; installing the endless power-transmitting element about the differential assembly; replacing the differential assembly to the carrier housing; installing the bearing caps to the carrier housing to secure the differential assembly to the carrier housing; and sliding the first and second axle shaft assemblies inwardly to engage the axle shaft assemblies to the differential assembly.

In another form, the present teachings provide a method of fabricating an axle assembly. The method includes: providing a carrier housing assembly with a carrier housing and a pair of bearing caps; removing the bearing caps; selecting a differential assembly from a group of at least two different differential assemblies; placing the selected differential assembly to the carrier housing; and installing the bearing caps to the carrier housing to secure the selected differential assembly to the carrier housing assembly such that the differential assembly is rotatable about a predetermined axis.

In still another form, the present teachings provide an axle assembly for a motorcycle having a pair of rear wheels. The axle assembly can include an axle housing, a differential assembly, a pair of axle shafts and an endless power transmitting element. The axle housing assembly has a carrier housing assembly and a pair of axle tubes. The carrier housing assembly includes a carrier housing and a pair of bearing caps that are removably coupled to the carrier housing to define a pair of bearing journal portions. The carrier housing defines a differential cavity with an opening through which the bearing caps can be removed from the carrier housing. The axle tubes are fixedly coupled to the carrier housing. The differential assembly includes a differential, a sprocket and a pair of differential bearings. The differential has a differential case with a pair of trunnions. The sprocket is coupled to the differential case and the differential bearings being mounted on the trunnions. The differential bearings are received between the bearing caps and the carrier housing to rotatably mount the differential assembly to the axle housing assembly. The axle shafts are received through the axle tubes and coupled to the differential assembly. The endless power transmitting element is coupled to the sprocket and extends out of the opening in the carrier housing.

In another form the present teachings provide a motorcycle having a frame, a power train, an endless power transmitting element and a rear axle assembly. The power train is coupled to the frame and has an output member. The endless power transmitting member is coupled to the output member. The rear axle assembly is mounted to the frame and has a carrier housing, a differential assembly and a pair of shafts. The carrier housing has a carrier structure and a pair of bearing caps. The carrier structure defines an opening through which the endless power transmitting member is received. The differential assembly is received in the carrier structure and is received about the differential assembly. The bearing caps are removably coupled to the carrier housing and cooperate with the bearing journals to support the differential assembly for rotation about a differential axis. The shafts are coupled to the differential assembly. Each of the shafts is configured to transmit rotary power between the differential assembly and a drive wheel.

In another form, the present teachings provide a motorcycle with a frame, a powertrain, an endless power transmitting member and a rear axle assembly. The power train is coupled to the frame and has an output member. The endless power transmitting member is coupled to the output member. The rear axle assembly is mounted to the frame and has a carrier housing, a differential assembly and a pair of shafts. The differential assembly is coupled to the carrier housing for rotation about a differential axis. The endless power transmitting element is disposed about the differential assembly and is configured to transmit rotary power between the output member of the power train and the differential assembly. The carrier housing includes a carrier structure and a member that is removable from the carrier structure to permit the endless power transmitting element to be moved through the differential axis between one of the shafts and the differential assembly to permit the endless power transmitting element to be drivingly engaged to the differential assembly.

In another form, the present teachings provide a method for installing an endless power-transmitting element to a drive axle of a motorcycle. The drive axle includes a carrier housing, a differential assembly and a pair of axle shaft assemblies. The carrier housing includes a carrier structure and a pair of bearing caps. The differential assembly is mounted to the carrier housing between the carrier structure and the bearing caps for rotation about a differential axis. Each of the axle shaft assemblies is configured to output rotary power from the differential assembly to an associated drive wheel. The method includes: disengaging at least one of the axle shaft assemblies from the differential assembly; removing at least one of the bearing caps from a carrier housing; creating a space between the carrier structure, the axle shaft assemblies and the differential assembly; installing the endless power-transmitting element through the space and about the differential assembly; securing the differential assembly between the carrier structure and the bearing caps; and re-engaging the at least one of the axle shaft assemblies to the differential assembly.

In yet another form, the teachings of the present disclosure provide an axle assembly that includes a carrier housing, a differential assembly and a pair of shafts. The carrier housing has a carrier structure and a pair of bearing caps. The carrier structure defines an opening that is configured to receive therethrough an endless power transmitting member for transmitting rotary power from a powertrain to the differential assembly. The differential assembly is received in the carrier structure. The bearing caps are removably coupled to the carrier housing and cooperate with a pair of bearing supports to support the differential assembly for rotation about a differential axis. The shafts are coupled to the differential assembly. Each of the shafts is configured to transmit rotary power between the differential assembly and an associated one of the driven wheels.

In still another form, the present teachings provide a method for replacing an endless power transmitting element in a motorcycle having a power train, a rear axle assembly and a pair of driven wheels. The rear axle assembly includes a carrier housing, a differential assembly and a pair of shafts. The carrier housing has a carrier structure and a pair of bearing caps. The differential assembly is received in the carrier structure. Each of the shafts has a first end, which is drivingly coupled to the differential assembly, and a second, opposite end that is coupled to an associated one of the driven wheels. The method includes untightening a plurality of threaded fasteners that secure a pair of bearing caps to a pair of bearing supports that are integrally formed with the carrier housing; mounting the endless power transmitting element about an output member of the power train; moving the differential assembly away from at least one of the bearing supports; mounting the endless power transmitting element about the differential assembly and through an opening in the carrier housing; and re-tightening the threaded fasteners to re-secure the bearing caps to the bearing supports.

In another form, the present teachings provide an axle assembly that includes a differential assembly, a pair of bearings and a carrier housing assembly. The differential assembly has a differential case and a drive member that is coupled to the differential case. The drive member is configured to engage an endless power transmitting element. The bearings are mounted to the opposite ends of the differential case. The carrier housing assembly has a carrier housing and a pair of bearing caps. Each of the bearings is received between the carrier housing and an associated one of the bearing caps to support the differential assembly for rotation relative to the carrier housing assembly about a rotational axis. The carrier housing includes a plurality of struts that are spaced circumferentially apart about the rotational axis such that a void space is formed between each adjacent pair of the struts. An opening is formed in the carrier housing and is configured to receive the endless power transmitting element there through.

In a further form, the present teachings provide an axle assembly that includes a differential assembly and a carrier housing assembly. The differential assembly has a differential case and a drive member that is coupled to the differential case. The drive member is configured to engage an endless power transmitting element. The carrier housing assembly has a carrier housing, a pair of bearing caps and a pair of axle tubes. The carrier housing defines a front opening, a rear opening and a pair of tubular end members into which the axle tubes are received. The front opening is configured to receive the differential assembly there through. The differential assembly is received between the carrier housing and the bearing caps. The front and rear openings are not covered or closed when the axle assembly is employed to drive the driven wheels.

In another form, the present teachings provide a method for replacing an endless power transmitting element in a motorcycle having a rear axle assembly with a pair of driven wheels. The method includes: removing the bearing caps from the carrier structure; disengaging the shafts from the differential assembly; moving the differential assembly away from carrier structure; mounting the endless power transmitting element about the differential assembly and through an opening in the carrier housing; replacing the bearing caps to the carrier structure; and re-engaging the shafts to the differential assembly.

In still another form, the present teachings provide a method for installing an endless power transmitting element to a rear axle assembly for a motorcycle having a pair of driven wheels. The method includes providing a carrier housing having a carrier structure and a pair of bearing caps; installing the endless power transmitting element about a differential assembly; mounting the differential assembly to the carrier structure such that the endless power transmitting element extends through an opening in the carrier structure; and coupling the bearing caps to the carrier structure.

In a further form, the present teachings provide a method for replacing an endless power transmitting element in a motorcycle having a rear axle assembly with a pair of driven wheels. The rear axle assembly includes a carrier housing, a differential assembly and a pair of shafts. The carrier housing has a carrier structure and a pair of bearing caps. The differential assembly is received in the carrier structure. Each of the shafts has a first end, which is drivingly coupled to the differential assembly, and a second, opposite end that is coupled to an associated one of the driven wheels. The method includes: untightening a plurality of threaded fasteners that secure a pair of bearing caps to a pair of bearing supports that are integrally formed with the carrier structure; moving the differential assembly away from at least one of the bearing supports; mounting the endless power transmitting element about the differential assembly and through an opening in the carrier housing; and re-tightening the threaded fasteners to re-secure the bearing caps to the bearing supports.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
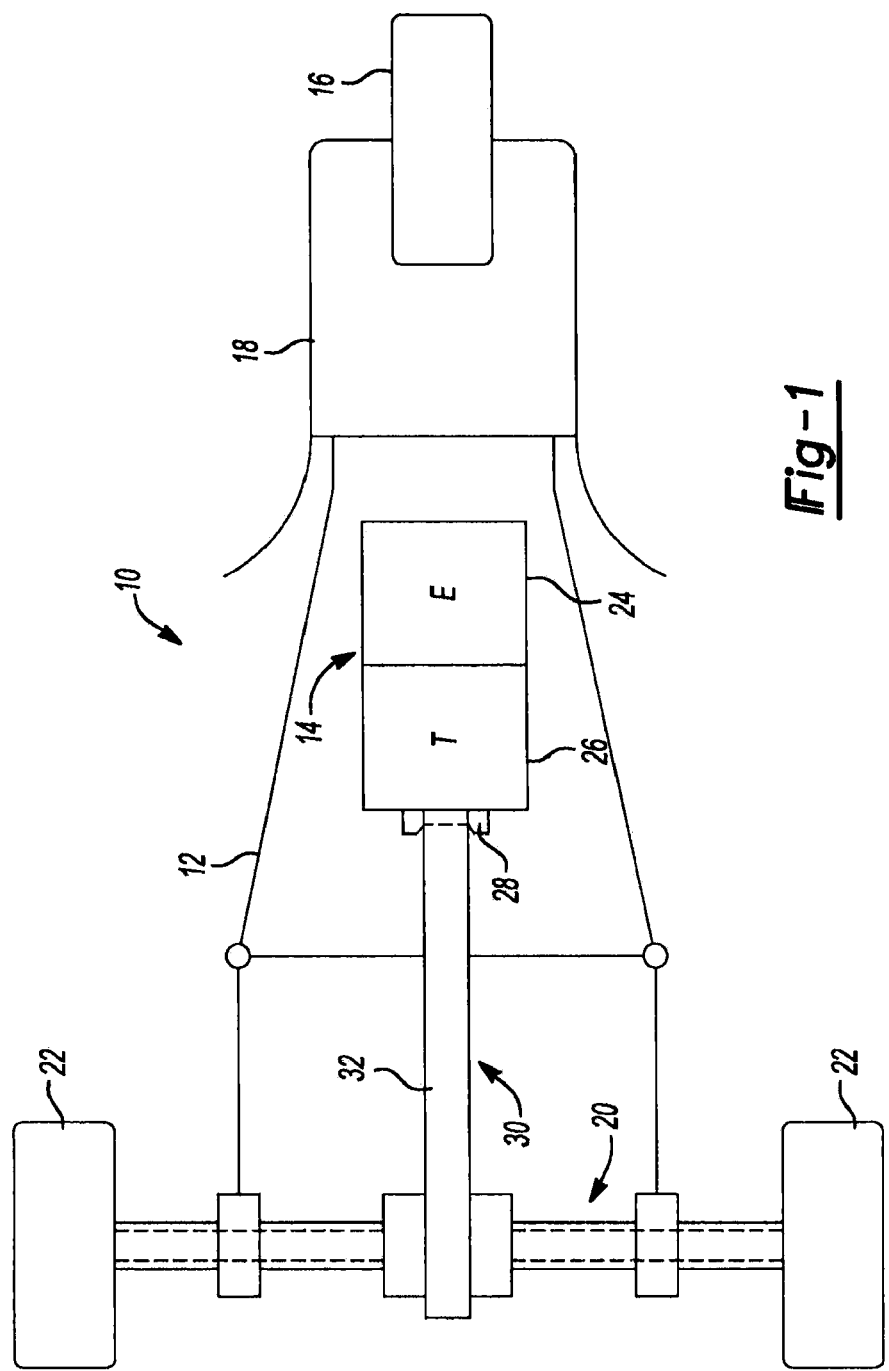
FIG. 1 is a schematic illustration of a motorcycle constructed in accordance with the teachings of the present disclosure.

With reference to FIG. 1 of the drawings, a motorcycle having a plurality of driven wheels constructed in accordance with the teachings of the present invention is generally indicated by reference numeral 10. The motorcycle 10 can include a frame 12, a powertrain 14 that can be coupled to the frame 12, a front wheel 16 that can be coupled to the frame 12 (e.g., via a fork 18), a rear axle assembly 20 that is movably mounted to the frame 12, and a pair of rear wheels 22 that are mounted on the rear axle assembly 20. In the particular example provided, the motorcycle 10 is a trike or three-wheeled motorcycle. Those of ordinary skill in the art will appreciate that the present disclosure has application to other types of vehicles and as such, it will be understood that the particular example provided will not limit the scope of the appended claims.

The powertrain 14 can have a power source and can output rotary power to the rear axle assembly 20. The rear axle assembly 20 can transmit the rotary power to the rear wheels 22. The power source can be any type of power source, including an electric motor, an engine or a combination thereof. In the particular example provided, the powertrain 14 includes an engine 24 that transmits rotary power to a transmission 26 having a plurality of manually selectable gear ratios and a transmission output member 28. A clutch (not specifically shown) can be employed to selectively interrupt the transmission of rotary power from the engine 24 to the transmission 26 (e.g., when shifting the transmission 26 between two gear ratios).

An endless power-transmitting element 30 can be employed to transmit rotary power from the transmission output member 28 to the rear axle assembly 20. In the particular example provided, the endless power-transmitting element 30 is a belt 32 and the transmission output member 28 is a toothed pulley or wheel (i.e., a sprocket), but other types of endless power-transmitting elements, such as chains, could also be employed. It will be appreciated that the teachings of the present disclosure have application to other motorcycle configurations that do not employ an endless power-transmitting element and as such, it will be understood that the particular example provided will not limit the scope of the appended claims.

With reference to FIGS. 2 through 11, the rear axle assembly 20 can include an axle housing assembly 100, a differential assembly 102 and a pair of axle shaft assemblies 104. The axle housing assembly 100 can include a carrier housing assembly 106, and a pair of axle tube assemblies 108.

The carrier housing assembly 106 can include a carrier housing 110 and a pair of bearing caps 112. The carrier housing 110 can be formed of any suitable material, such as steel, cast iron or aluminum, and can be formed in any desired manner (e.g., weldment, sand casting, die casting). The carrier housing 110 can include a pair of end members 120 and a plurality of strut members 122, such as an upper strut member 122a, a lower strut member 122b and a rear strut member 122c. Each of the end members 120 can include a generally tubular structure 130 and a bearing support 132. An associated one of the bearing caps 112 can be removably coupled to the bearing support 132 via a plurality of threaded fasteners 134 to form a bearing support portion 136. A bore 138 can be formed through each end member 120 and can concentrically intersect a bearing bore 148 that can be formed into the bearing support portion 136. The bore 138 can be formed of a uniform diameter throughout its length, or could be formed as in the particular example provided with a first portion 140 that is relatively bigger in diameter than a remaining portion 142 to thereby define a shoulder 144. One or more tube coupling apertures 150 can be formed through the tubular structure 130 and can intersect the bore 138 (e.g., the first portion 140 of the bore 138). It will be appreciated that one or both of the bearing caps 112 (and optionally the carrier housing 110) can be configured to aid the assembly technician, service technician or operator of the motorcycle 10 (FIG. 1) to replace the bearing caps 112 to their respective bearing support 132. For example, the bearing caps 112 could be identified with indicia (e.g., numbers, letters, symbols or combinations thereof), such as L and R (to designate the bearing caps 112 as being associated with bearing support portions 136 on the left and right sides of the rear axle assembly 20, respectively). Alternatively, the bearing caps 112 and/or the carrier housing 110 could be configured so that a given one of the bearing caps 112 may only be assembled to a predetermined one of the bearing supports 132. For example, one of the bearing caps 112 could be configured to nest into a portion of the carrier housing 110 like pieces of a jigsaw puzzle, the positions of the fasteners 134 could be different for each of the bearing caps 112, or a dowel pin could be disposed in the joint face between the bearing cap 112 and its respective bearing support 132 for one or both of the bearing support portions 136 (if employed in both, the location of the dowel pins could be different for each of the bearing support portions 136).

The opposite ends of the strut members 122 can be coupled to the end members 120 and can be contoured to define a differential cavity 154 between the end members 120. The upper and lower strut members 122a and 122b can be configured to resist bending of the axle housing assembly 100 in a vertical direction (relative to the operational orientation of the rear axle assembly 20 as depicted in FIG. 1), while the rear strut member 122c can be configured to resist bending of the rear axle assembly 20 in a fore-aft direction (relative to the operational orientation of the rear axle assembly 20 as depicted in FIG. 1). The strut members 122 can have any desired cross-sectional shape and can include strengthening features 158, such as gussets 160 and ribs 162. The strengthening features 158 can be disposed along all or part of the strut members 122 in a desired direction and can be coupled to one or both of the end members 120. If desired, one or more apertures can be formed into one or more of the strut members 122 to provide access to the differential cavity 154 (e.g., to facilitate the servicing of the differential assembly 102). In the particular example provided, a sensor aperture 166 is formed in the upper strut member 122a and is configured to receive a sensor 168, such as a Hall-effect sensor, that can sense a portion of the differential assembly 102.

Each axle tube assembly 108 can include a tube structure 170, a pair of suspension mounts 172, and a brake attachment structure 174. The tube structure 170 can be unitarily formed or can be a multi-component structure having a tube member 180 and a bearing mount 182 that can be coupled to an end of the tube member 180 as in the particular example illustrated. An axle shaft aperture 184 can be formed through the tube structure 170 and a shaft bearing aperture 186 can be formed in an end of the tube structure 170 (e.g., in the bearing mount 182). The suspension mounts 172 can comprise any type of suspension mount for mounting the rear axle assembly 20 to a vehicle. In the example provided, each suspension mount 172 includes a first plate member 190, which is fixedly coupled (e.g., welded) to the tube structure 170 at a predetermined location, and a second plate member 192 that may be moved over at least a portion of the length of the tube structure 170. Threaded fasteners (not shown) may be employed to clamp the first and second plate members 190 and 192 to the mounting hardware (not shown) that is employed to couple the rear axle assembly 20 to a remainder of the motorcycle 10 (FIG. 1). The brake attachment structure 174 can be a plate-like structure that can be configured to mount a caliper assembly (not shown) to the rear axle assembly 20. It will be appreciated, however, that an alternatively configured brake attachment structure (not shown) could be employed to mount another type of brake, such as a drum brake, to the rear axle assembly 20. An end of the tube structure 170 opposite the shaft bearing aperture 186 can be received into the bore 138 in a corresponding one of the end members 120. In the example provided, each tube structure 170 is received in the first portion 140 of the bore 138 and abutted against the shoulder 144. Any suitable means may be employed to fixedly couple (or fixedly but removably couple) the axle tube assemblies 108 to the carrier housing 110. In the particular example provided, the tube structure 170 is press-fit into the first portion 140 of the bore 138 and the tube member 180 is accessed through the tube coupling apertures 150 to form a weld (e.g., puddle weld) on the tube member 180 that inhibits both axial and rotational movement of the axle tube assemblies 108 relative to the carrier housing 110.

The differential assembly 102 can be mounted to the carrier housing 110 between the bearing supports 132 and the bearing caps 112 and can be configured to transmit rotary power from the powertrain 14 (FIG. 1) of the motorcycle 10 (FIG. 1) to the axle shaft assemblies 104. In the particular example provided, the differential assembly 102 includes a differential 200, a sprocket assembly 202, a pair of differential bearings 204, and a sensor wheel 206. The differential 200 can be any type of differential, including an open differential, a limited slip differential, a locking differential, and can comprise any desired means for transmitting rotary power, including gears (e.g., bevel pinion and side gears, helical pinions that extend generally parallel to a rotational axis of the differential 200, friction plates). In the example illustrated, the differential 200 is an open differential that employs a gearset 210, which has a plurality of bevel pinion gears (i.e., a pair of pinion gears 212 and a pair of side gears 214), and which is housed in a differential case 216. The differential case 216 can include a first case member 218 and a second case member 220 that can be coupled to one another via a plurality of threaded fasteners 222 and which can define a cavity 224 into which the gearset 210 can be received. The first case member 218 can define a first trunnion 230, while the second case member 220 can define a second trunnion 232 and a sprocket coupling portion 234. A trunnion bore 236 can be formed through the first and second trunnions 230 and 232 and can intersect the cavity 224. The sprocket coupling portion 234 can include a plurality of longitudinally-extending, circumferentially spaced-apart teeth or splines (not specifically shown). A suitable seal or gasket (not specifically shown) can be disposed between the first and second case members 218 and 220 and a suitable lubricant filling means, such as a Zerk fitting 238, can be installed to or incorporated in the differential case 216.

The sprocket assembly 202 can include a first sprocket portion 240, a second sprocket portion 242 and one or more isolators 244 that can be disposed between the first and second sprocket portions 240 and 242. The first sprocket portion 240 can include a hub portion 250 and a power-transmitting portion 252 that can be coupled to the hub portion 250. The power-transmitting portion 252 can be configured to receive power from the powertrain 14 (FIG. 1) via an "endless" power transmitting member, such as the belt 32 (FIG. 1). While the first sprocket portion 240 is illustrated as being unitarily formed, it will be appreciated that the hub portion 250 and the power-transmitting portion 252 could be discrete components that could be non-rotatably coupled to one another. Configuration in this manner permits a majority of the sprocket assembly 202 to be utilized regardless of the particular means that is employed to transmit drive torque between the powertrain 14 (FIG. 1) of the motorcycle 10 (FIG. 1). In this regard, a different power transmitting portion could be designed and constructed to facilitate the use of a differently configured belt (not shown), a chain (not shown) or a shaft drive (not shown). In the latter case, the power-transmitting portion 252 could be configured as a bevel ring gear, for example. The hub portion 250 can include a complementary bearing mount 256 and a bearing set 258 can be employed to mount the hub portion 250 to the second trunnion 232. A retaining ring 260 can be installed to an annular groove 262 formed about the second trunnion 232 and can abut the inner bearing race 264 of the bearing set 258.

The second sprocket portion 242 can include a mating sprocket coupling portion 268 that can matingly engage the sprocket coupling portion 234 of the differential case 216 to thereby non-rotatably couple the second sprocket portion 242 to the differential case 216. In the example provided, the mating coupling portion 268 includes a plurality of mating teeth or splines (not specifically shown) that matingly engage the splines of the sprocket coupling portion 234. The fasteners 222 that are employed to couple the first and second case members 218 and 220 to one another can also be employed to fixedly but removably couple the second sprocket portion 242 to the differential case 216. In the example provided, the fasteners 222 are received through holes (not shown) in the first and second case members 218 and 220 and are threadably received into threaded holes (not shown) that are formed in the second sprocket portion 242. The hub portion 250 of the first sprocket portion 240 and the second sprocket portion 242 can cooperate to define a plurality of circumferentially spaced-apart cavities 270 into which the isolators 244 can be received. Each of the circumferentially spaced-apart cavities 270 can include radially inner and outer walls 272 and 274, respectively, which can be defined by the second sprocket portion 242, and a pair of radially extending sidewalls (not specifically shown) that can be disposed generally transverse to the radially inner and outer walls 272 and 274. In the particular example provided, each of the radially extending sidewalls is formed by the second sprocket portion 242 and the isolators 244, which are formed of a resilient material, frictionally engage the radially adjacent faces 280 and 282 of the first and second sprocket portions 240 and 242, respectively, to transmit rotary power therebetween. It will be appreciated that the radially extending sidewalls could be formed by both the first and second sprocket portions 240 and 242. For example, a sidewall formed by the first sprocket portion 240 could be circumferentially disposed between a pair of sidewalls formed by the second sprocket portion 242.

The differential bearings 204 can be coupled to the first and second trunnions 230 and 232 (e.g., press-fit) and can be received in respective ones of the journal bearing portions 136 between a respective bearing support 132 and bearing cap 112. It will be appreciated that the differential bearings 204 rotatably mount the differential case 216 to the carrier housing 110 about a predetermined axis 290. The differential bearings 204 can be any suitable type of bearings but in the example provided, are sealed roller bearings.

The sensor wheel 206 can be coupled to the differential case 216 or the sprocket assembly 202 and can include a plurality of circumferentially spaced-apart sensor targets 192 that can be sensed by the sensor 168 that is coupled to the carrier housing 110. The sensor 168 can responsively generate a sensor signal that can be received by a controller 296. The controller 296 can employ the sensor signal to determine a rotational speed of the differential case 216. It will be appreciated that the rotational speed of the differential case 216 can be employed for various purposes, including control of the powertrain 14 (FIG. 1) to reduce the output speed or torque of the powertrain 14 (FIG. 1) and/or to control the caliper assembly (not shown), as when anti-lock braking, traction control and/or vehicle stability control is provided on a vehicle.

Each of the axle shaft assemblies 104 can include a shaft 300, a shaft bearing 302, a spacer ring 304, a retaining ring 306, and a bearing retaining plate 308. The shaft 300 can include a shaft member 310, which can be configured to be received in the tube structure 170, and a wheel flange 312 that can be configured to be coupled to one of the rear wheels 22 (FIG. 1) of the motorcycle 10 (FIG. 1). The shaft member 310 can include a proximal end, which can have a plurality of spline teeth 316, and a distal end onto which a shaft bearing journal 318 can be formed. The spline teeth 316 can be meshingly engaged to a plurality of mating spline teeth 320 that are formed on the inside diameter of the side gear 214 to thereby rotatably couple the shaft 300 to a respective one of the side gears 214. The bearing retaining plate 308, the shaft bearing 302, the spacer ring 304 and the retaining ring 306 can be received onto the shaft bearing journal 318. In this regard, the bearing retaining plate 308 and the spacer ring 304 can be slidably received over the shaft bearing journal 318, the shaft bearing 302 can be press-fit onto the shaft bearing journal 318 and the retaining ring 306 can be received into an annular groove 324 that can be formed in the shaft bearing journal 318. The bearing retaining plate 308 can be removably coupled to an end of the tube structure 170 via a plurality of fasteners 328 and can apply a clamping force to the outer bearing race 330 of the shaft bearing 302 that clamps (i.e., non-rotatably couples) the outer bearing race 330 to the tube structure 170. It will be appreciated that the shaft bearings 302 support the distal ends of the shaft members 300 in the tube structures 170 and that the retaining rings 306 and the spacer rings 304 cooperate to support a side of the shaft bearings 302 opposite the bearing retaining plates 308.

While not shown, it will be understood from this disclosure that seals can be installed to the proximal ends of the tube structures 170 and to the trunnion bore 236 in the first and second trunnions 230 and 232 to sealingly engage the shaft members 310 so as to inhibit the infiltration of moisture and debris into the axle tube assemblies 108 and the differential case 216.

To install (or replace) the endless power-transmitting element (e.g., belt 32 of FIG. 1), it will be appreciated from this disclosure that axle housing assembly 100 need not be disassembled so as to separate the axle tube assemblies 108 from one another. In this regard, the bearing retaining plates 308 can be uncoupled from the tube structures 170 and the axle shaft assemblies 104 can be slid outwardly from the differential assembly 102; the bearing caps 112 can be uncoupled from the carrier housing 110; the differential assembly 102 can be removed from the carrier housing 110 so as to permit an endless power-transmitting element about the perimeter of the power-transmitting portion 252 of the first sprocket portion 240; and the rear axle assembly 20 can be re-assembled through the reversal of the aforementioned steps. As the rear axle assembly 20 is not disassembled to such an extent that the axle tube assemblies 108 are decoupled from one another when an endless power-transmitting element is installed or replaced, important dimensions and tolerances, such as the overall length of the axle assembly, the distance between the suspension mounts 172, and the distance between the power-transmitting portion 252 of the first sprocket portion 240 and the suspension mounts 172 are not affected, and the runout of the differential assembly 102 changes very little, if at all. Consequently, an endless power-transmitting element can be installed or changed without affecting the performance of the motorcycle 10 (FIG. 1).

Figure 12:
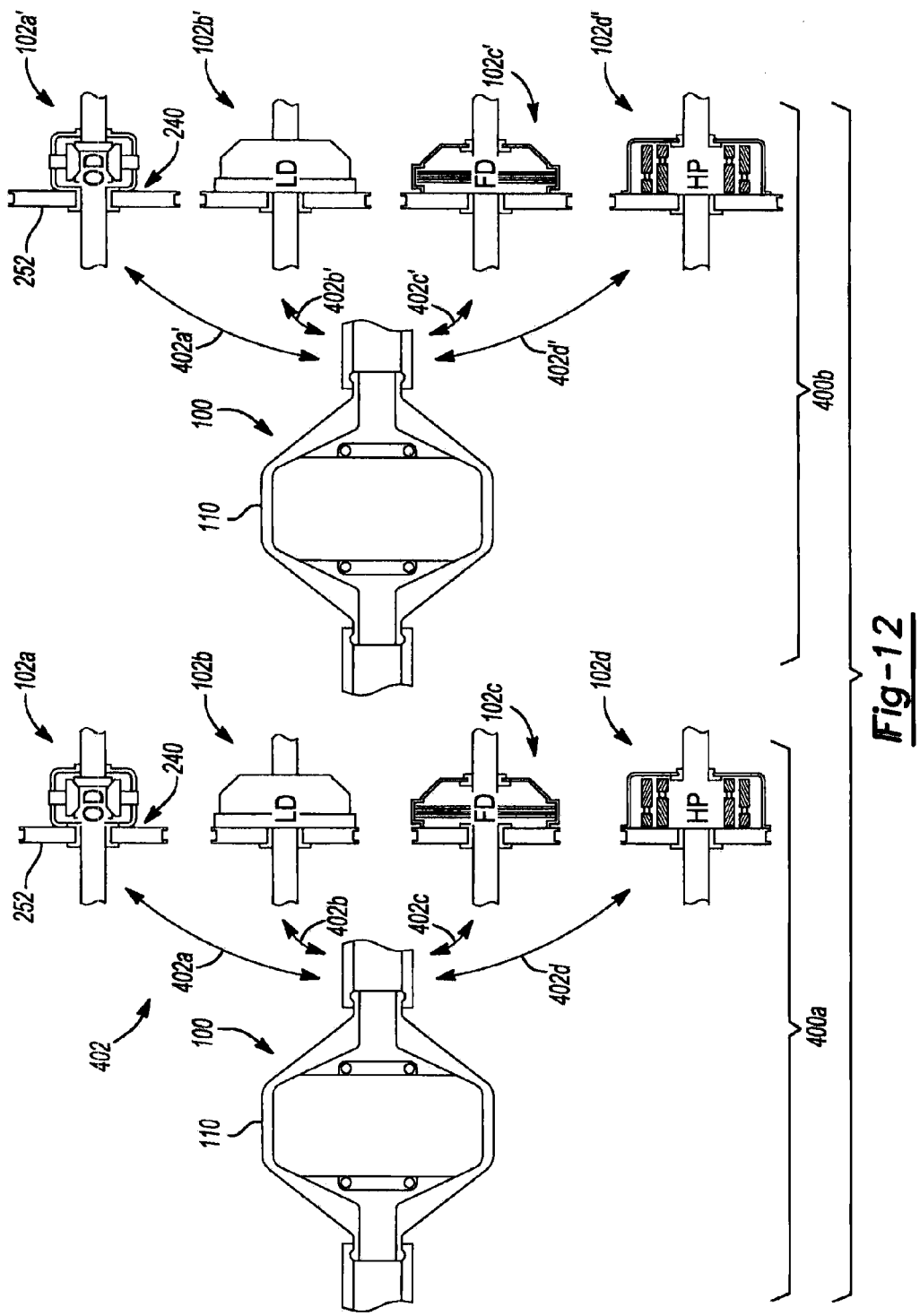
FIG. 12 is a schematic illustration of two families of rear axle assemblies constructed in accordance with the teachings of the present disclosure.

Another advantage of the rear axle assembly 20 concerns its modular configuration. In this regard, portions of the rear axle assembly 20, such as the carrier housing 110 or the entire axle housing assembly 100, can be common across a family of axle assemblies to thereby provide alternative axle assemblies at a relatively lower cost. For example, the axle housing assembly 100 may be common across a first family of axle assemblies 400a as depicted in FIG. 12, while the differential assembly that is employed by each family member 402 is different. In this regard, a first family member 402a employs a differential assembly 102a having an open differential configuration, a second family member 402b employs a differential assembly 102b having a selectively lockable differential configuration, a third family member 402c employs a differential assembly 102c with a limited slip configuration, and a fourth family member 402d employs a differential assembly 102d with a helical pinion arrangement. A second family of axle assemblies 400b is generally similar to that of the first family of axle assemblies 400a, except that the power-transmitting portion 252 of the first sprocket portion 240 is sized differently so as to provide the family members 402a' through 402d' of the second family of axle assemblies 400b with a reduction ratio (input speed to output speed) that is different from that of the family members 402a through 402d of the first family of axle assemblies 400a.

It will be appreciated that other families of axle assemblies could be fabricated. For example, a third family of axle assemblies can be generally similar to that of the first family of axle assemblies 400a, except that the family members of the third family of axle assemblies utilize different axle tube assemblies (for example, the axle tube assemblies are similar to those describe above, but employ different suspension mounts). As another example, a fourth family of axle assemblies can be generally similar to that of the first family of axle assemblies 400a, except that the carrier housing 110 of the family members of the fourth family of axle assemblies is machined to provide a different camber angle and/or toe angle.

Figure 13:
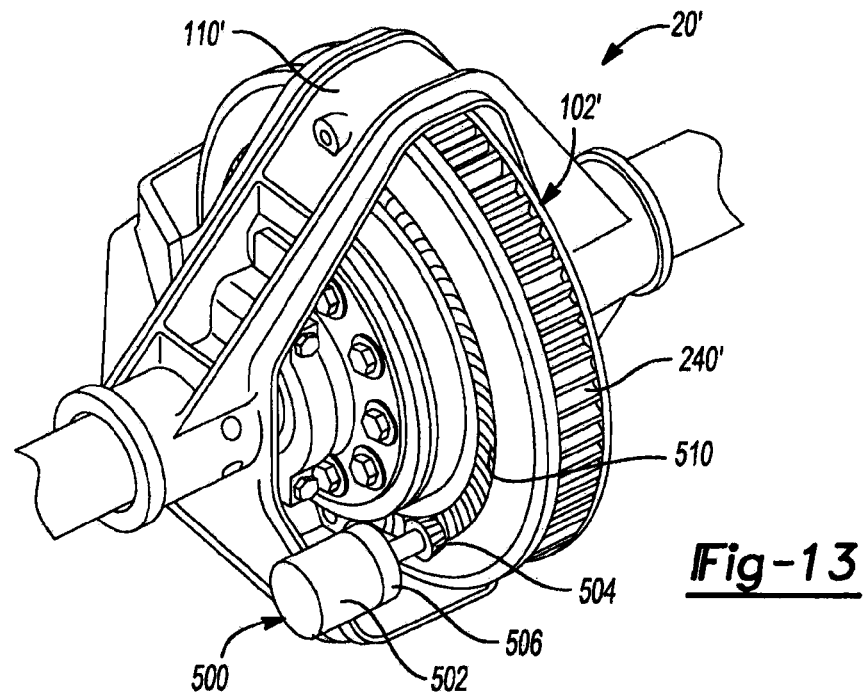
FIG. 13 is a perspective view of a portion of another rear axle assembly constructed in accordance with the teachings of the present disclosure.
Figure 14:
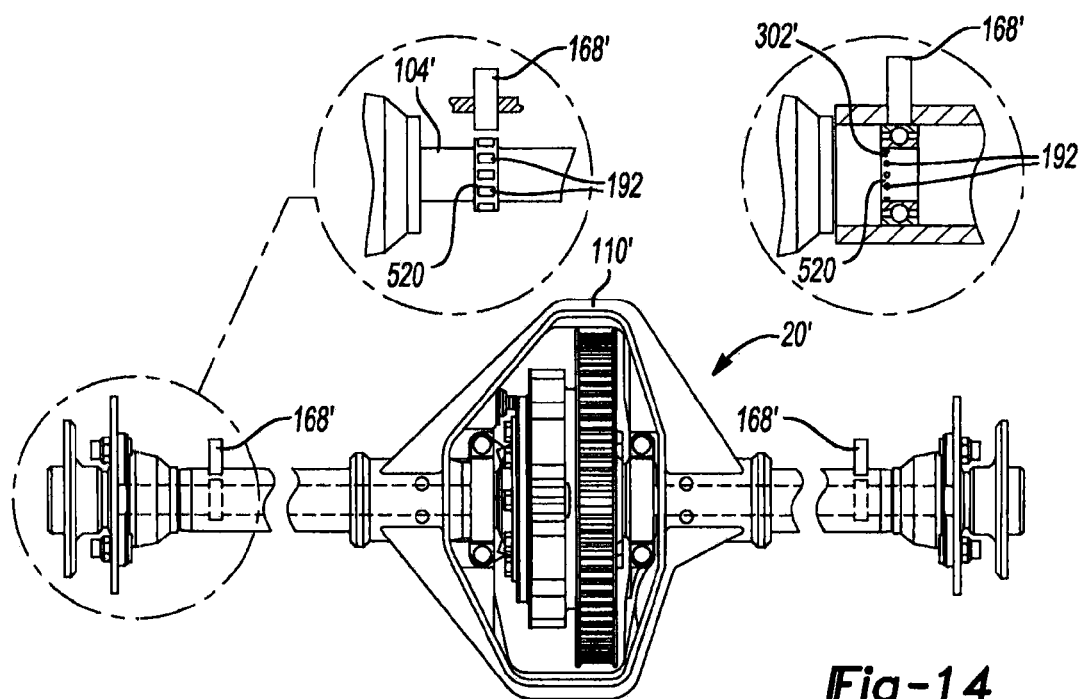
FIG. 14 is a schematic illustration of the rear axle assembly of FIG. 13.

In the example of FIGS. 13 and 14, a portion of another axle assembly constructed in accordance with the teachings of the present disclosure is generally indicated by reference numeral 20'. The rear axle assembly 20' can be generally similar to the rear axle assembly 20 of FIGS. 2 through 11, except that the rear axle assembly 20' includes a motor assembly 500 and a pair of sensors 168'. The motor assembly 500 can be mounted to the carrier housing 110' and can include an electric motor 502, an output member 504 that can be driven by the electric motor 502, and a clutch 506 that can be employed to rotationally decouple the output member 504 from the electric motor 502. The output member 504 can be any type of output member that can transmit rotary power to the differential assembly 102'. In the particular example provided, the output member 504 is a pinion and is meshingly engaged to an internal gear 510 that can be coupled to or formed on a side of the first sprocket portion 240'. The motor assembly 500 can be operated to cause the output member 504 to be driven by the electric motor 502 to drive the differential assembly 102' in a direction that would permit a vehicle that incorporates the rear axle assembly 20' to be moved in a reverse direction. The clutch 506 can be configured to rotationally de-couple the output member 504 from the electric motor 502 when the vehicle that incorporates the rear axle assembly 20' is moved in a forward direction.

Each of the sensors 168' can be coupled to one of the axle tube assemblies 108' and can be configured to sense the plurality of sensor targets 192 that are associated with tone wheel 520 that is coupled for rotation with the axle shaft assemblies 104'. It will be appreciated that the tone wheels 520 can be coupled to any portion of the axle shaft assemblies 104' and that they could be coupled to the shaft bearings 302'. It will also be appreciated that the sensors 168' replace the single sensor 168 that is employed in the example of FIGS. 2 through 11 and that the sensor signals generated by the sensors 168' can be employed for anti-lock braking, traction control and/or vehicle stability control even where the differential assembly 102' employs an open differential, a limited slip differential or a selectively locking differential.

Figure 15:
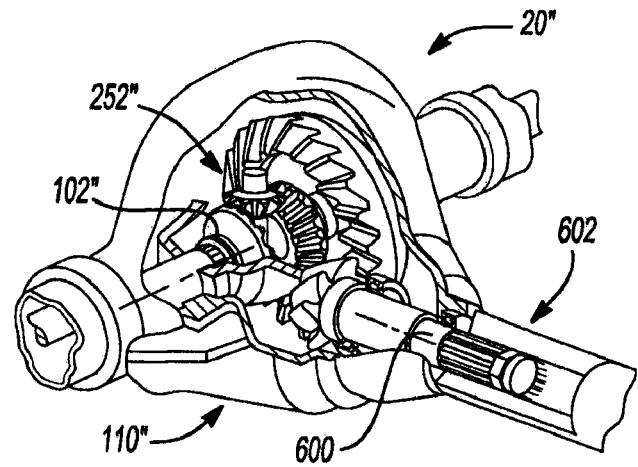
FIG. 15 is a perspective view of a portion of another rear axle assembly constructed in accordance with the teachings of the present disclosure.

In the example of FIG. 15, a portion of another axle assembly constructed in accordance with the teachings of the present disclosure is generally indicated by reference numeral 20". The rear axle assembly 20" can be generally similar to the rear axle assembly 20 of FIGS. 1 through 11, except that the carrier housing 110" can be fully enclosed, the power-transmitting portion 252" of the differential assembly 102" can be a bevel ring gear, and an input pinion 600 can be housed by carrier housing 110"'. Rotary power can be transmitted to the rear axle assembly 20" via a shaft 602 that can be non-rotatably coupled to the input pinion 600 (e.g., via a mating set of spline teeth).

Figure 2:
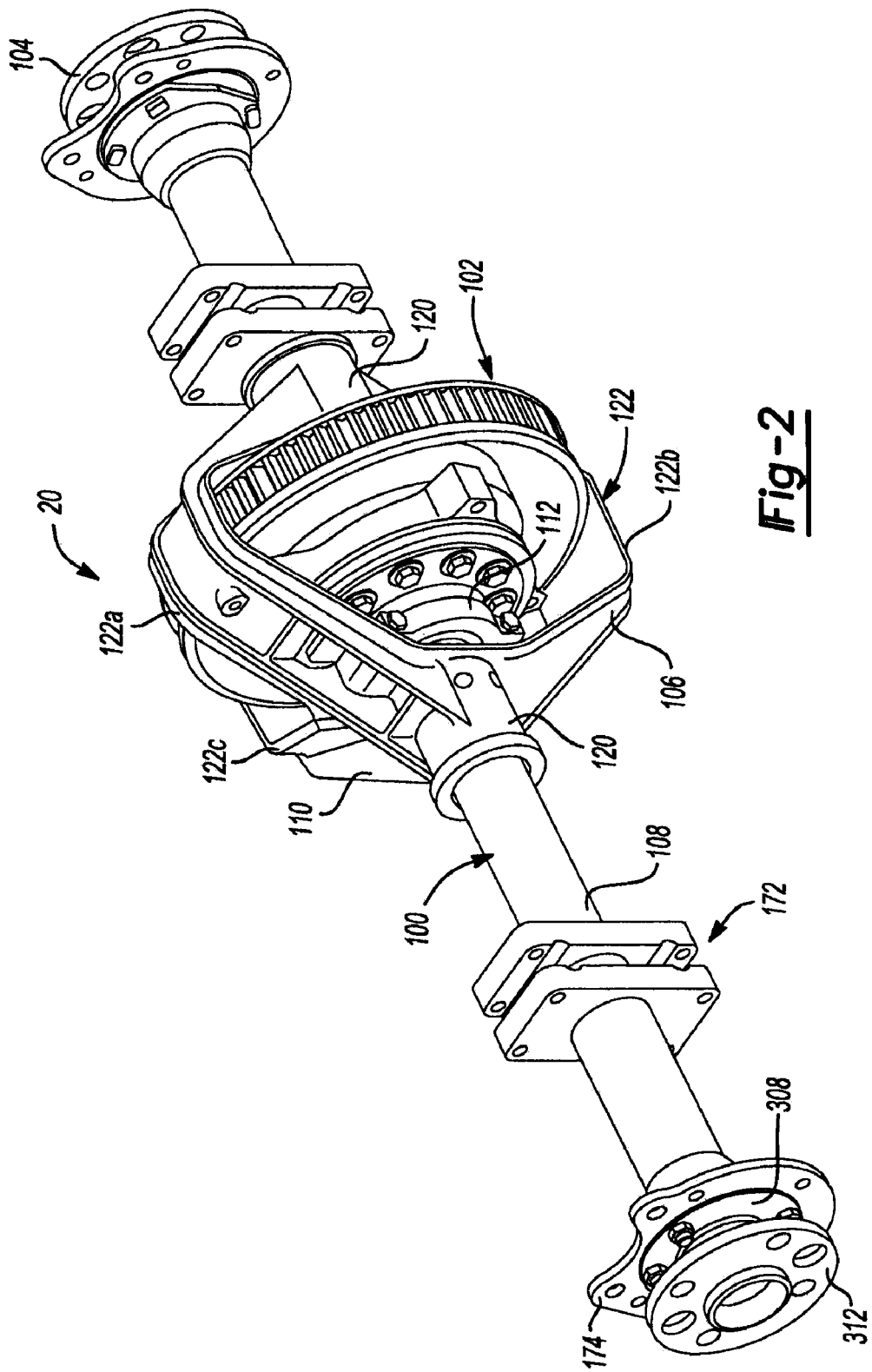
FIG. 2 is a front perspective view of a portion of the motorcycle of FIG. 1, illustrating the rear axle assembly in more detail.
Figure 3:
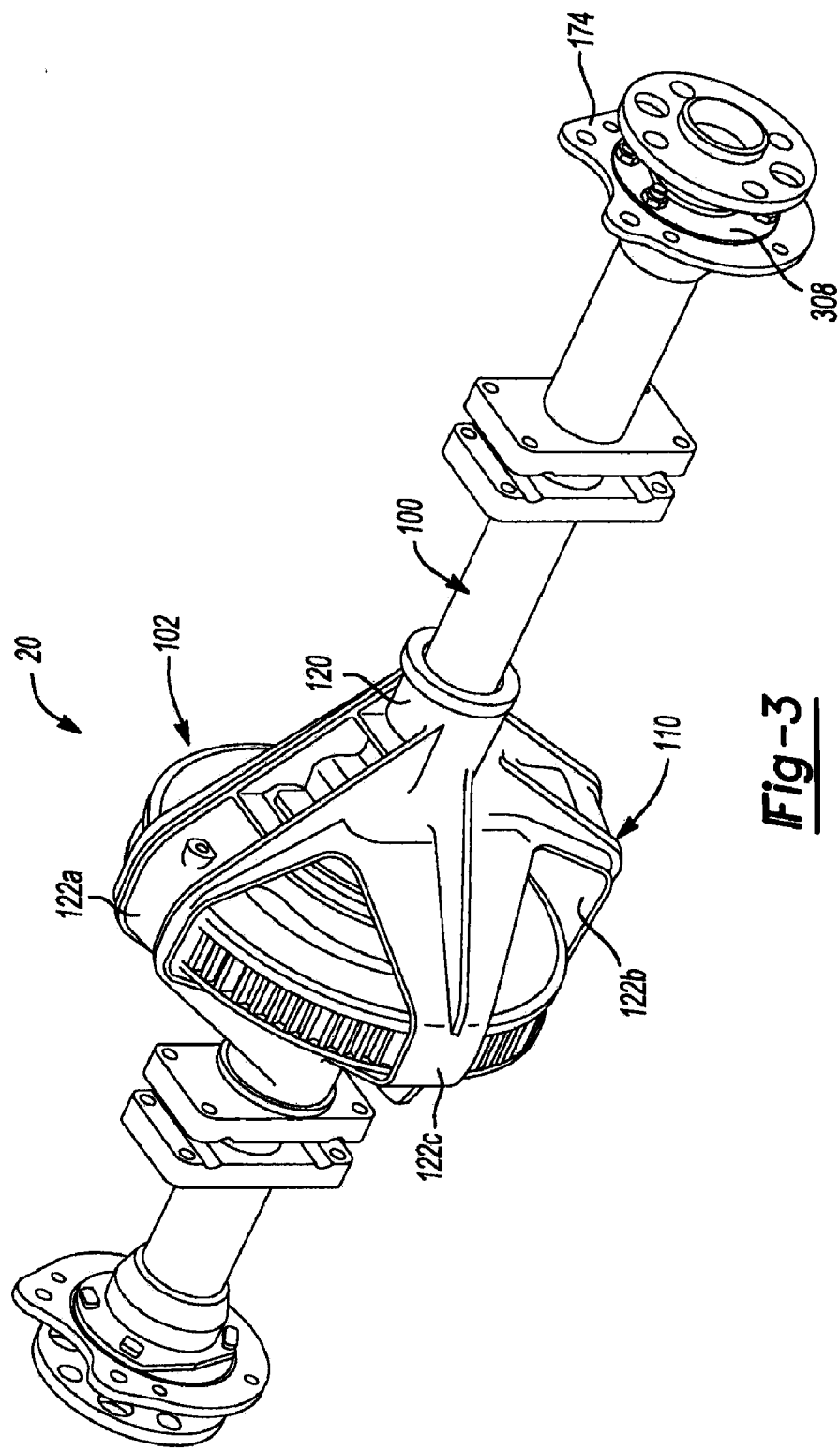
FIG. 3 is a rear perspective view of the rear axle assembly.
Figure 4:
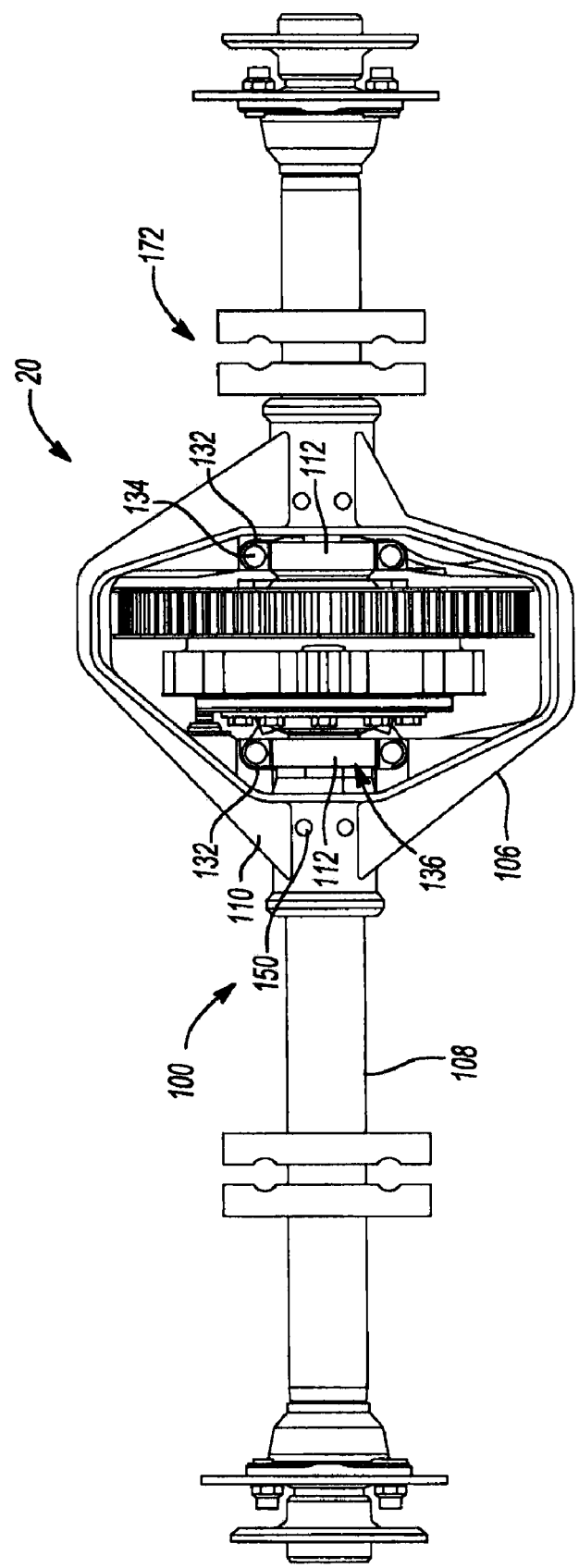
FIG. 4 is a front elevation view of the rear axle assembly.
Figure 5:
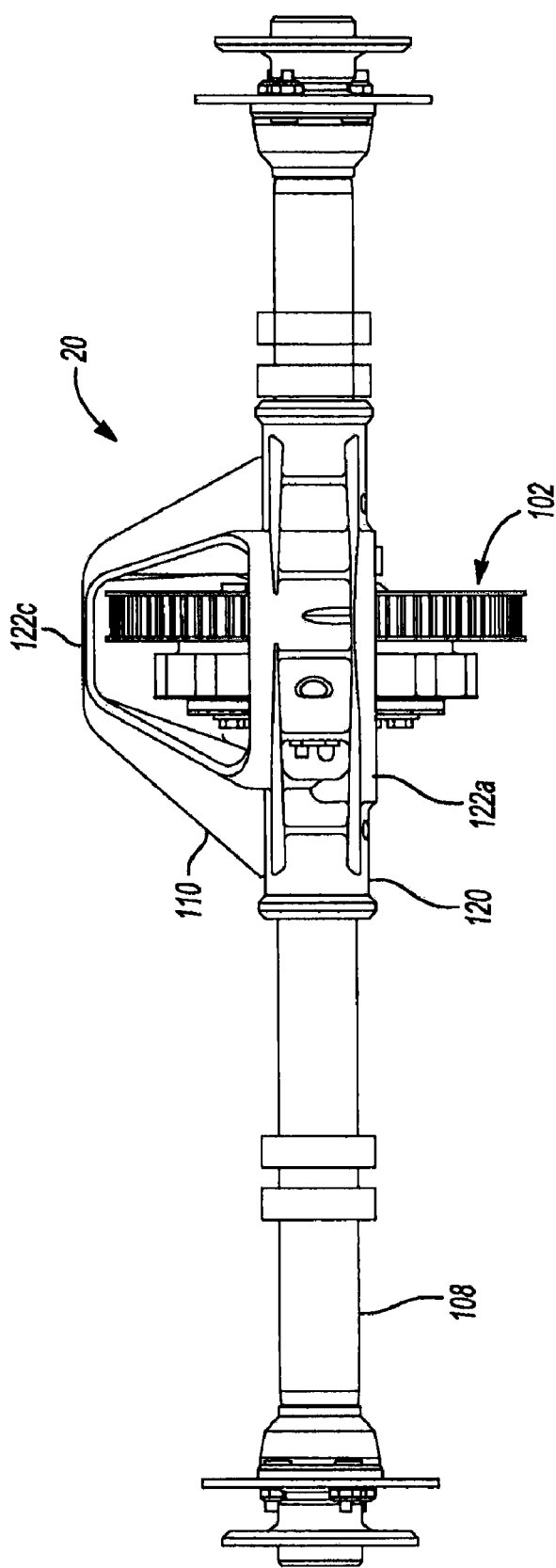
FIG. 5 is a top plan view of the rear axle assembly.
Figure 6:
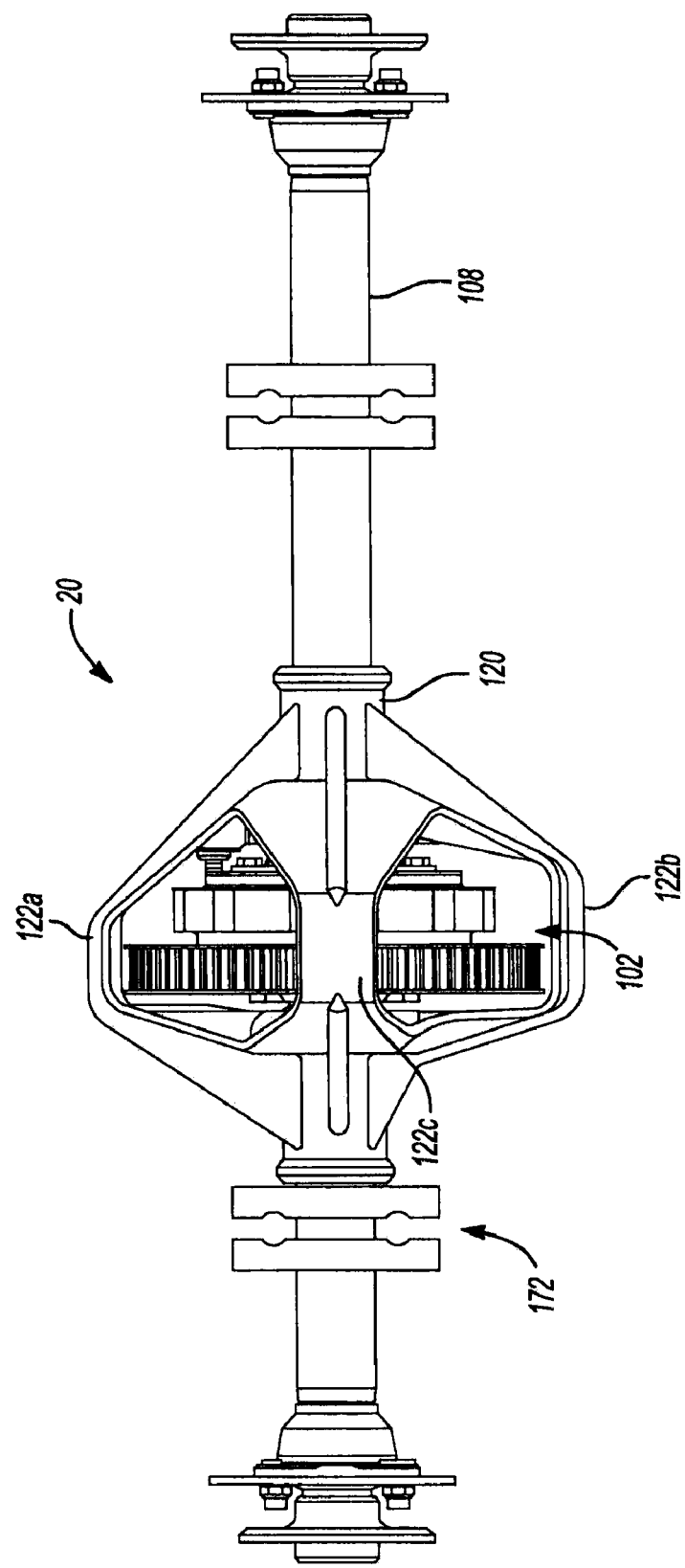
FIG. 6 is a rear elevation view of the rear axle assembly.
Figure 7:
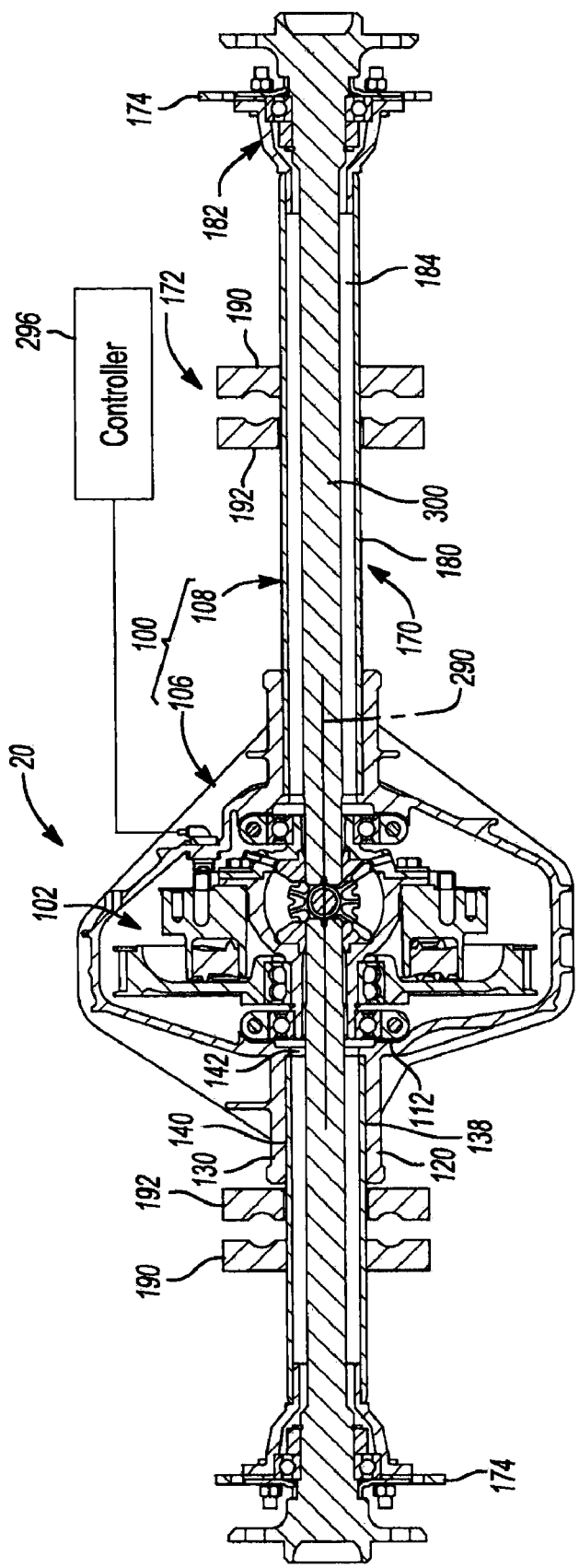
FIG. 7 is a longitudinal cross-sectional view of the rear axle assembly.
Figure 8:
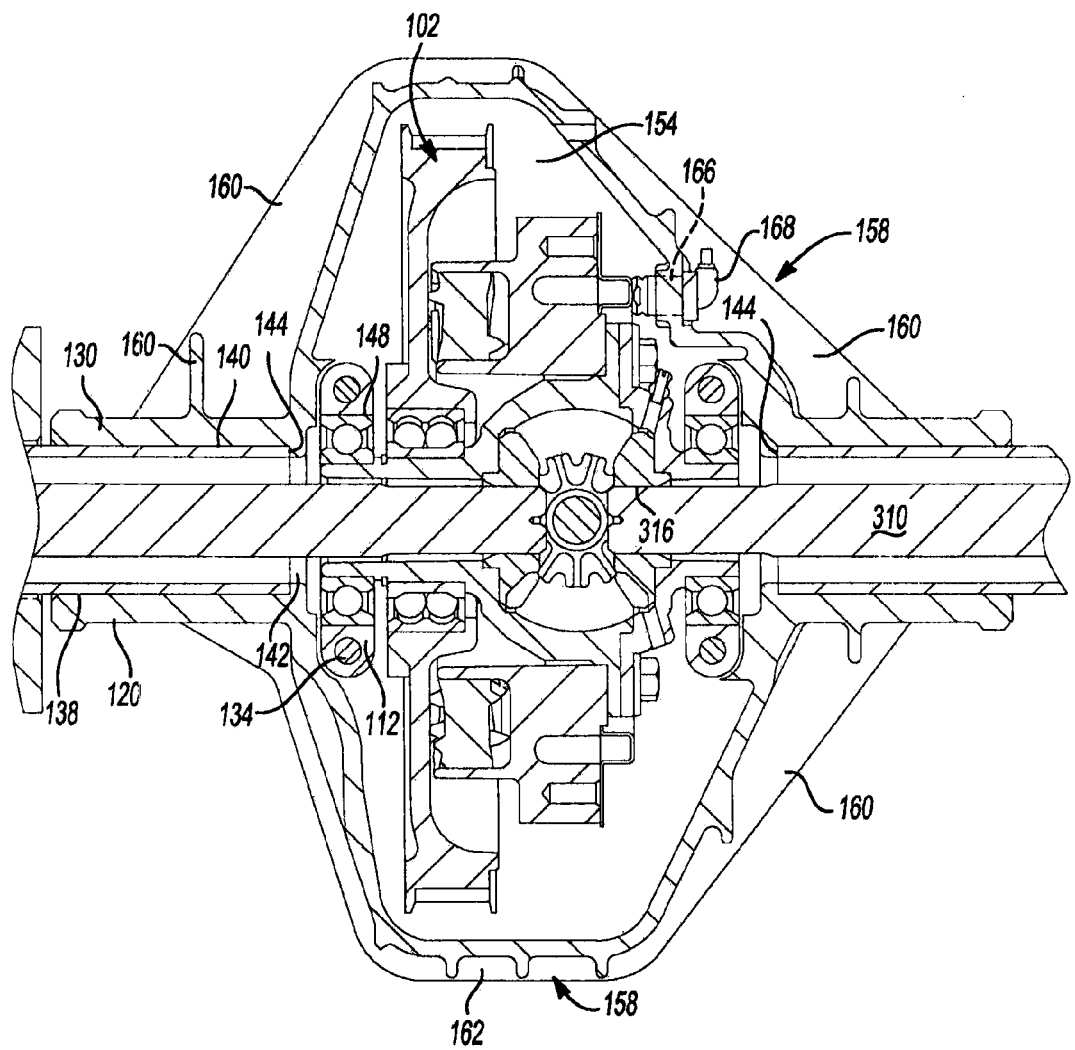
FIG. 8 is an enlarged view of a portion of FIG. 7 illustrating the carrier housing and the differential assembly in greater detail.
Figure 8A:
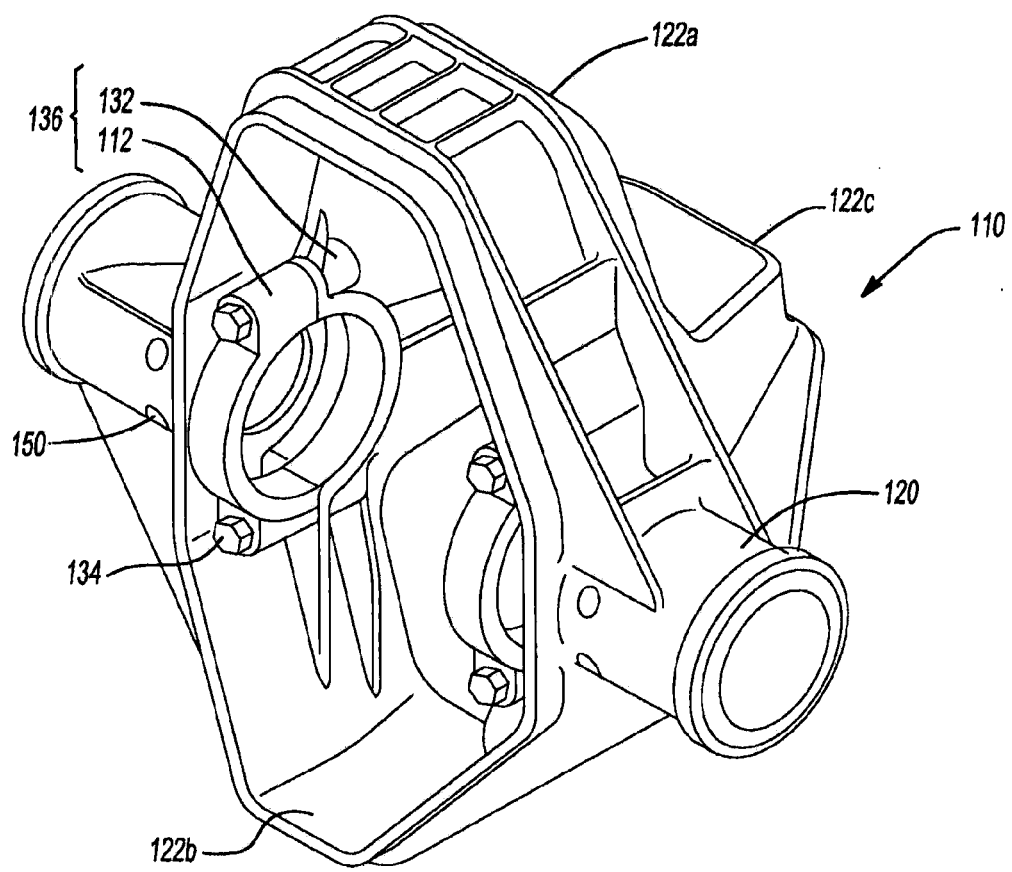
FIG. 8A is a perspective view of the carrier housing.
Figure 9:
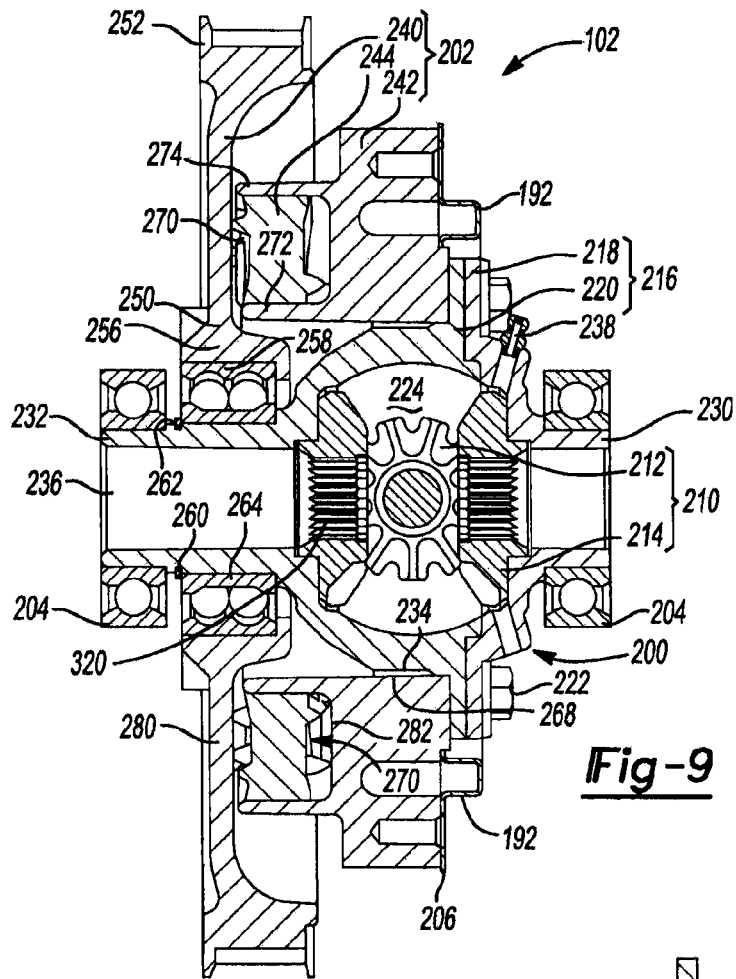
FIG. 9 is an enlarged view of a portion of FIG. 7 illustrating the differential assembly in greater detail.
Figure 10:
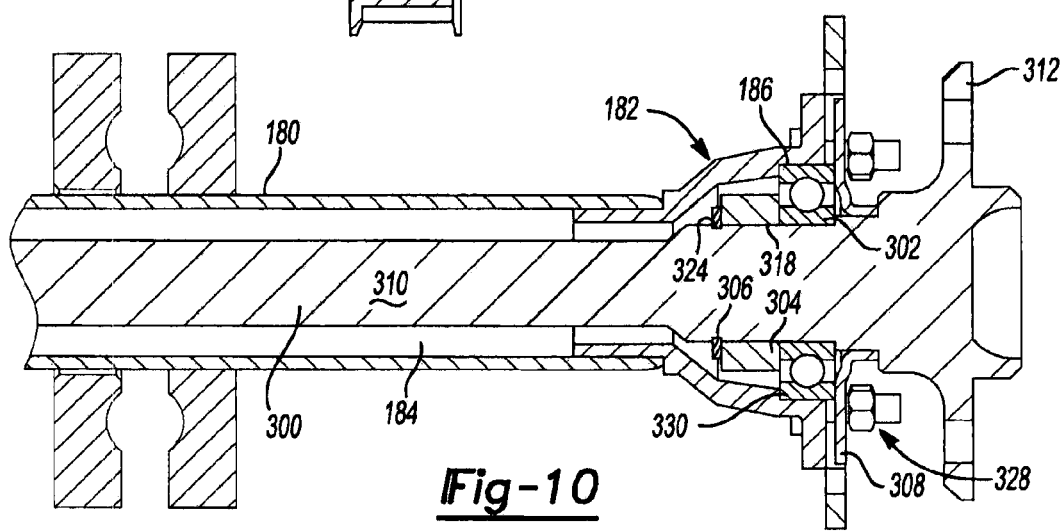
FIG. 10 is an enlarged view of a portion of FIG. 7 illustrating the distal end of the axle shaft assembly in greater detail.
Figure 11:
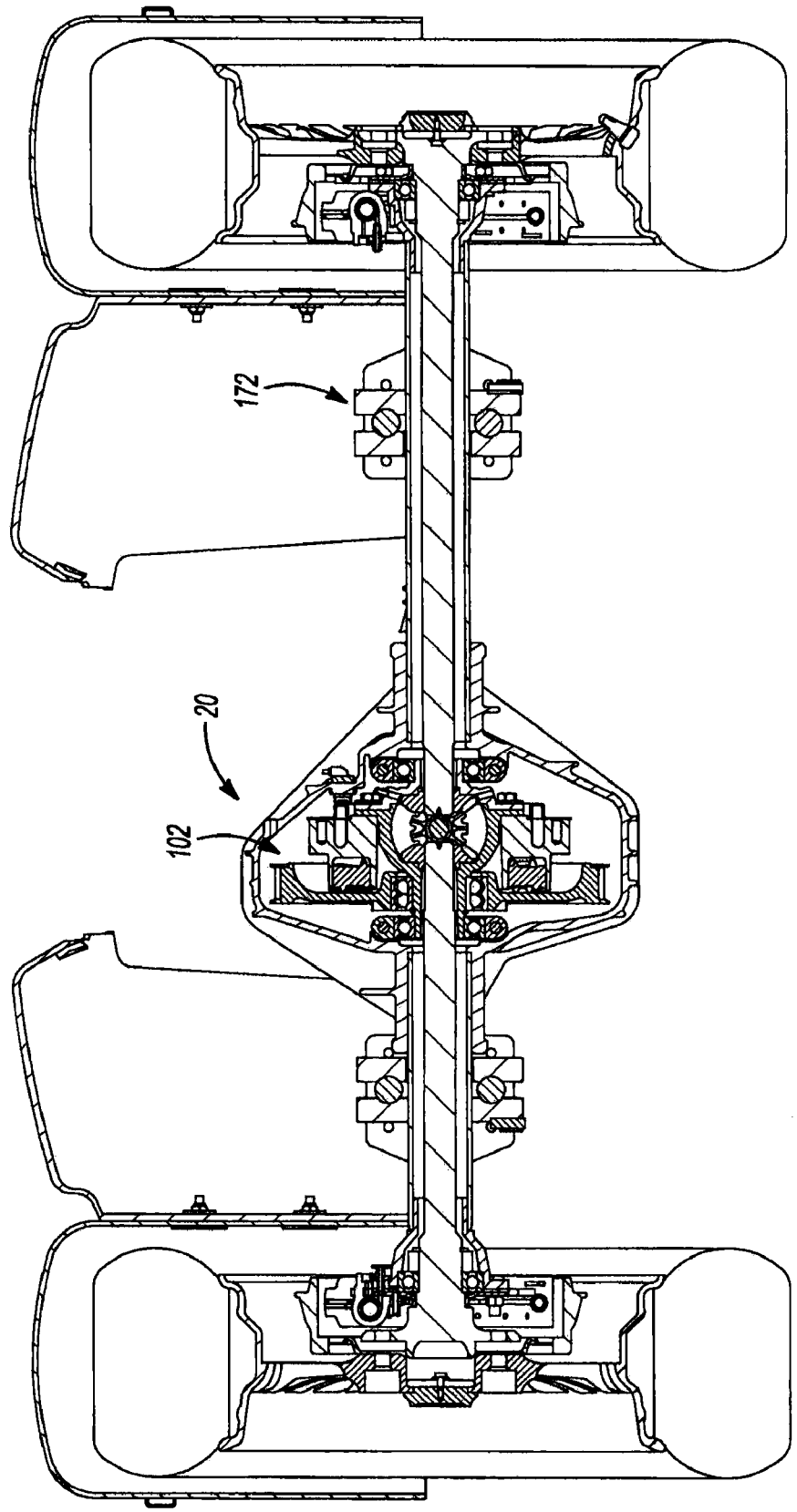
FIG. 11 is a sectional view similar to that of FIG. 7 but taken through the motorcycle.
Figure 16:
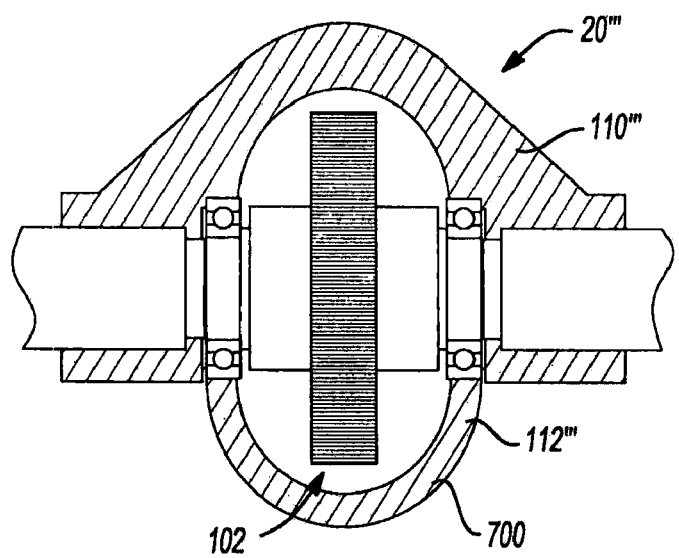
FIG. 16 is a schematic cross-sectional view of another rear axle assembly constructed in accordance with the teachings of the present disclosure.
Figure 17:
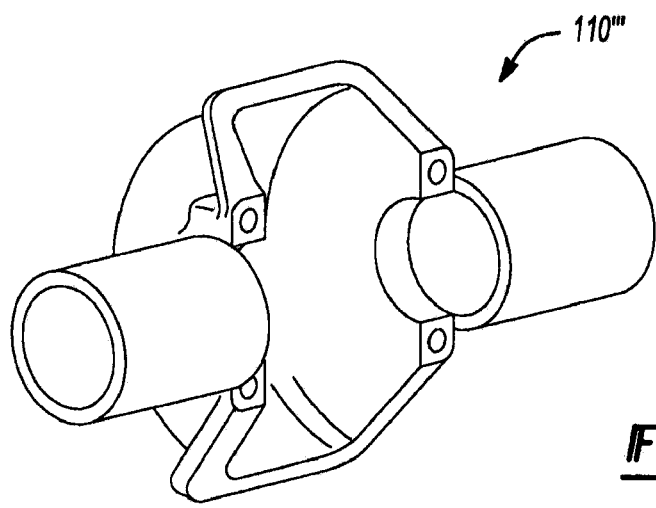
FIG. 17 is a perspective view of a portion of the rear axle assembly of FIG. 16, illustrating the carrier housing in more detail.

In the example of FIGS. 16 and 17, a portion of yet another axle assembly constructed in accordance with the teachings of the present disclosure is generally indicated by reference numeral 20'''. The rear axle assembly 20''' can be generally similar to the rear axle assembly 20 of FIGS. 1 through 11, except that a cover 700 with integral bearing caps 112" can be employed in lieu of the individual bearing caps 112 (FIG. 2). The cover 700 can be coupled to the carrier housing 110''' and can shroud a portion of the differential assembly 102. The cover 700 can be notched as necessary to provide clearance for the endless power transmitting element.

In a further example, the rear axle assembly can be generally similar to the rear axle assembly 20 of FIGS. 1 through 11, except that the differential assembly can employ a multi-speed gearset that can have at least two gear ratios. The at least two gear ratios could include a high speed gear ratio and a low speed gear ratio and/or could include one or more forward gear ratios and a reverse gear ratio.

In another example, rear axle assembly can be generally similar to the rear axle assembly 20 of FIGS. 1 through 11, except that the endless power-transmitting element, the first sprocket portion of the differential assembly and the output member of the powertrain can form a continuously variable transmission. In this regard, the first sprocket portion and the output member employ variable diameter pulleys (not shown) that form a Variable-Diameter Pulley or Reeves drive. Alternatively, the first sprocket portion of the differential assembly and the output member of the powertrain can be configured as adjustable sprockets to which sprocket teeth can be added or subtracted. An example of one such sprocket configuration is described in U.S. Pat. No. 5,406,863.

Figure 18:
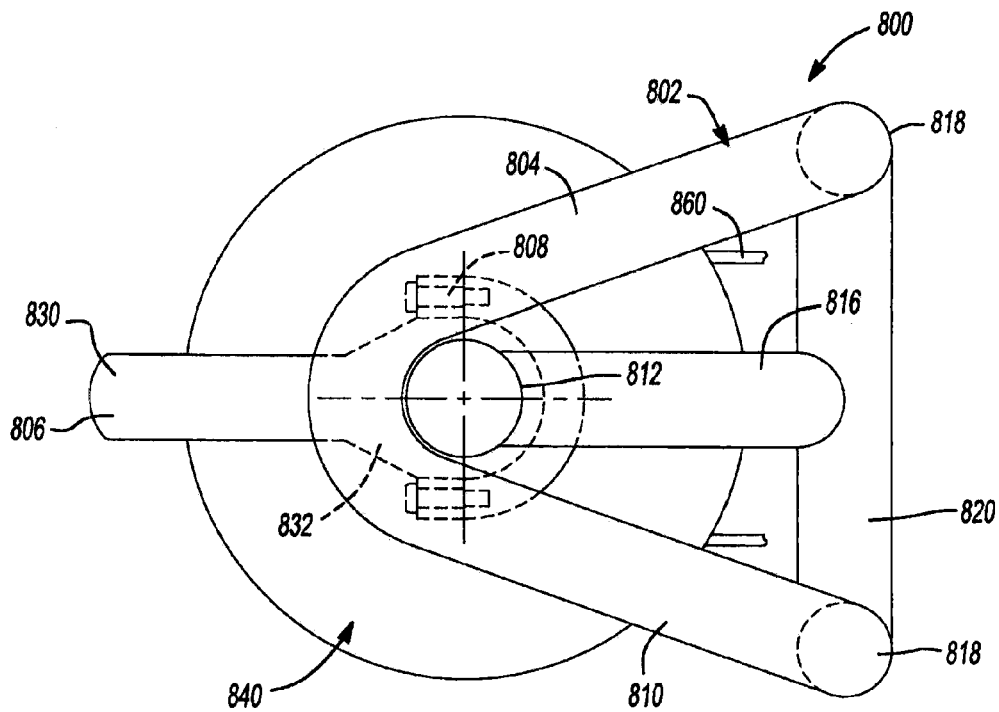
FIG. 18 is a side elevation view of a portion of another rear axle assembly constructed in accordance with the teachings of the present disclosure.
Figure 19:
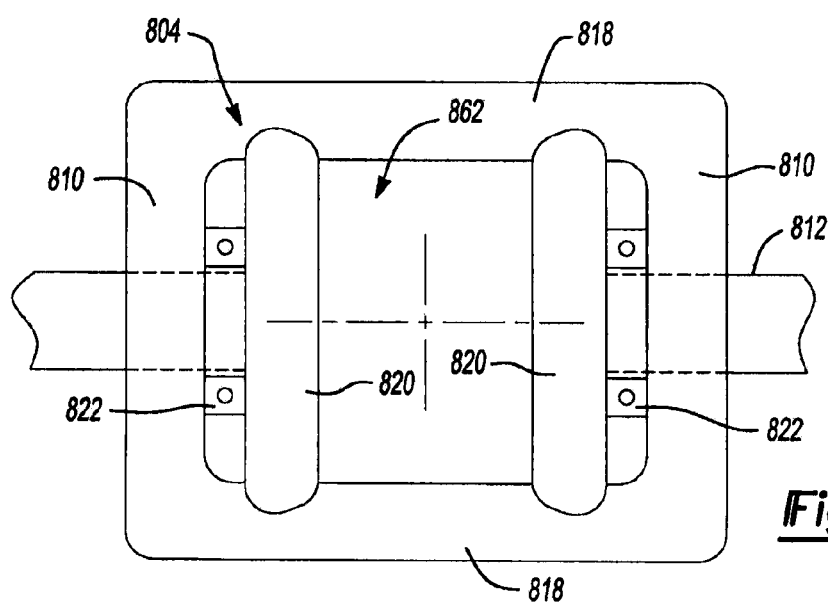
FIG. 19 is a rear elevation view of a portion of the rear axle assembly of FIG. 18.

A further rear axle assembly 800 is illustrated in FIG. 18. The rear axle assembly 800 can include an axle housing assembly 802 that can include a front carrier portion 804 and a rear carrier portion 806 that can be removably coupled to the front carrier portion 804 by a plurality of threaded fasteners 808. With additional reference to FIG. 19, the front carrier portion 804 can include a pair of V-shaped end members 810, a pair of tube structures 812, a pair of first gussets 816 (only one shown), a pair of laterally extending members 818, a pair of second gussets 820 and a pair of bearing supports 822 that can be coupled together (e.g., via welding). The rear carrier portion 806 can include a generally U-shaped or C-shaped strap member 830 and a pair of bearing caps 832 (only one shown) that can be matingly engaged to the bearing supports 822. The differential assembly 840 can include a pair of differential bearings (not shown) that can be disposed between the bearing supports 822 and the bearing caps 832. It will be appreciated that an endless power transmitting element 860, such as a belt or a chain, can be coupled to the differential assembly 840 and can extend from the rear axle assembly 800 from an aperture 862 defined by the pair of laterally extending members 818 and the pair of second gussets 820.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A method for replacing an endless power transmitting element in a motorcycle having a rear axle assembly with a pair of driven wheels, the rear axle assembly comprising a carrier housing, a differential assembly and a pair of shafts, the carrier housing having a carrier structure and a pair of bearing caps, the differential assembly being received in the carrier structure, each of the shafts having a first end, which is drivingly coupled to the differential assembly, and a second, opposite end that is coupled to an associated one of the driven wheels, the method comprising:
   untightening a plurality of threaded fasteners that secure a pair of bearing caps to a pair of bearing supports that are integrally formed with the carrier structure;
   moving the differential assembly away from at least one of the bearing supports;
   mounting the endless power transmitting element about the differential assembly and through an opening in the carrier housing; and
   re-tightening the threaded fasteners to re-secure the bearing caps to the bearing supports.

2. The method of claim 1, wherein moving the differential assembly away from at least one of the bearing supports comprises decoupling at least one of the shafts from the differential assembly.

3. The method of claim 2, wherein the at least one of the shafts is slid along its longitudinal and rotational axis when it is decoupled from the differential assembly.

4. The method of claim 3, wherein the axle housing assembly comprises a pair of axle tubes that are fixedly coupled to the carrier housing and wherein decoupling at least one of the shafts from the differential assembly comprises removing a bearing retaining plate from one of the axle tubes.

5. The method of claim 4, wherein the axle tubes are integrally formed with the carrier housing.

6. The method of claim 1, wherein the endless power transmitting element is a belt.

7. The method of claim 1, wherein the endless power transmitting element is a chain.

8. A method for installing an endless power transmitting element to a rear axle assembly for a motorcycle having a pair of driven wheels, the method comprising:
   providing a carrier housing having a carrier structure and a pair of bearing caps;
   installing the endless power transmitting element about a differential assembly;
   mounting the differential assembly to the carrier structure such that the endless power transmitting element extends through an opening in the carrier structure; and
   coupling the bearing caps to the carrier structure.

9. The method of claim 8, wherein the differential assembly has a pair of output members and wherein the method further comprises rotatably coupling an axle shaft to each of the output members of the differential assembly.

10. The method of claim 8, further comprising coupling the endless power transmitting element to an output member of a power train.

11. The method of claim 8, wherein the endless power transmitting element is a belt.

12. The method of claim 8, wherein the endless power transmitting element is a chain.

13. A method for replacing an endless power transmitting element in a motorcycle having a rear axle assembly with a pair of driven wheels, the rear axle assembly comprising a carrier housing, a differential assembly and a pair of axle shafts, the carrier housing having a carrier structure and a pair of bearing caps, the differential assembly being received in the carrier structure, each of the shafts having a first end, which is drivingly coupled to the differential assembly, and a second, opposite end that is coupled to an associated one of the driven wheels, the method comprising:
   removing the bearing caps from the carrier structure;
   disengaging the shafts from the differential assembly;
   moving the differential assembly away from the carrier structure;
   mounting the endless power transmitting element about the differential assembly and through an opening in the carrier housing;
   replacing the bearing caps to the carrier structure; and
   re-engaging the shafts to the differential assembly.

14. The method of claim 13, wherein moving the differential assembly away from the carrier structure comprises removing the differential assembly from the carrier structure.

15. The method of claim 13, wherein disengaging the shafts from the differential assembly comprises sliding the shafts along their longitudinal and rotational axes in a direction away from the differential assembly.

16. The method of claim 13, wherein the axle housing assembly comprises a pair of axle tubes that are fixedly coupled to the carrier housing and wherein disengaging the shafts from the differential assembly comprises decoupling a pair of bearing retaining plates from the axle tubes.

17. The method of claim 13, wherein the endless power transmitting element is a belt.

18. The method of claim 13, wherein the endless power transmitting element is a chain.

* * * * *